June 27, 1939.　　　V. N. JENKINS　　　2,164,013
METHOD OF SEPARATING OIL AND WAX
Filed Dec. 23, 1936
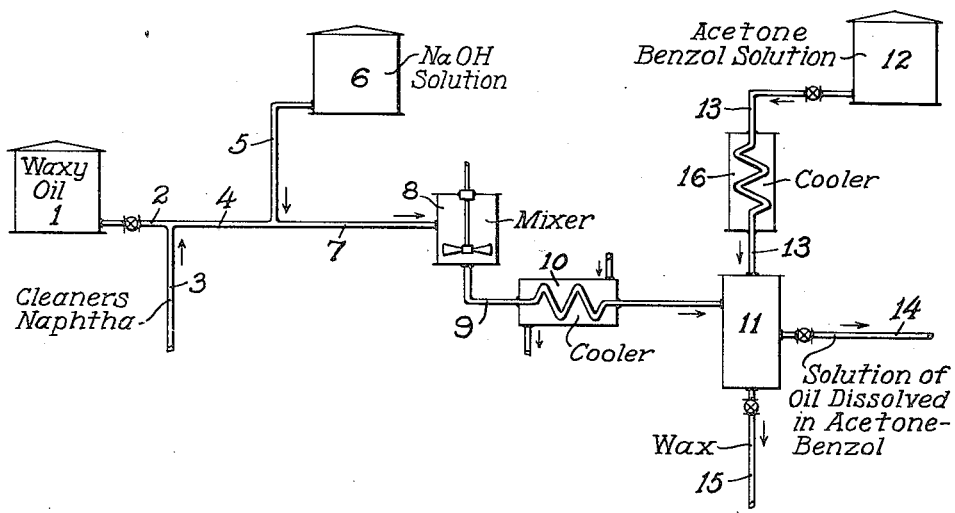
INVENTOR.
Vance N. Jenkins
BY
ATTORNEY.

UNITED STATES PATENT OFFICE 2,164,013

METHOD OF SEPARATING OIL AND WAX

Vance N. Jenkins, Long Beach, Calif., assignor to Union Oil Company of California, Los Angeles, Calif., a corporation of California Application December 23, 1936, Serial No. 117,318

7 Claims. (Cl. 196—18)

The present invention relates to the separation of oil and wax, and more particularly pertains to a method wherein a mixture of oil and wax is emulsified, suspended or otherwise dispersed and is then separated into its constituent parts by means of a solvent adapted to remove the oil. The method may be used either as a dewaxing process for removing wax from a waxy oil or as a deoiling process for removing oil from an oily wax.

Conventional dewaxing processes involve chilling the waxy oil until the wax solidifies as crystals in the oil, and then removing the wax by settling, filter pressing, or centrifuging. Solvents and/or diluents may or may not be added to effect a cleaner and more rapid separation of wax from the oil.

It is the main object of the present invention to provide a method for separating oil and wax in which there is rapid establishment of equilibrium and consequent rapid and clean separation of oil and wax. It is a further object of the invention to provide a method which lends itself readily to continuous operation.

It has been discovered that these objects may be accomplished by forming a dispersion, emulsion or suspension of the oil-wax mixture preparatory to separation in its constituent fractions, and it has been further discovered that wax and oil in such a dispersed state may be readily separated by washing the dispersion, emulsion, or suspension with a solvent.

The present invention, therefore, broadly stated, resides in emulsifying, suspending, or otherwise dispersing a mixture of oil and wax, and in extracting the oil from the dispersed wax with a suitable solvent. Specifically stated, the invention comprises emulsifying a mixture of oil and wax at a temperature conveniently above its solidification point, cooling the emulsion to a temperature below the solidification point of the wax, and contacting it with a solvent adapted to remove the oil. Still more specifically stated, it comprises commingling an oil-wax mixture with a sufficient quantity of aqueous alkali solution to produce a dispersion of the type more fully described hereinbelow, cooling said emulsion or dispersion to a temperature below the solidification point of the wax, and contacting it with preferably prechilled solvent in order to remove the oil. The solvent leaches the oil from the emulsion or suspension, and when allowed to settle the mixture separates into phases comprising a clear supernatant solution of oil and solvent, and a fairly fluid lower layer containing the emulsified wax and a small amount of solvent. In this fluid state the wax can be withdrawn and pumped as required for continuous operation. The solvent phase containing the extracted oil may be topped to remove the solvent and to recover the substantially or completely wax-free oil. For purposes of deoiling, the emulsified wax, after separation from the layer of oil and solvent, may be subjected to one or more additional washings with solvent in order to completely remove the oil. It may then be treated to break the emulsion and to recover the deoiled wax. This is accomplished by neutralizing the caustic, if caustic were used as the emulsifying agent, with a mineral acid such as sulphuric acid, by heating under pressure, by centrifuging the emulsion, by distilling the solvent and water away from the caustic, or by any of the known methods of breaking emulsions. The aqueous layer is separated, and any residual solvent and water is removed from the wax as by topping.

An essential feature of the present invention resides in preparing the oil-wax mixture for separation of oil from wax. This is accomplished by dispersing the oil-wax mixture prior to the leaching operation. In this dispersed state, the particles are discrete and the structure sufficiently open and accessible to permit ready treatment for separation of the oil-wax mixture into its component parts. There is also the added advantage of fluidity of the mixture which permits operation of the process on a continuous basis. While these advantages may be achieved by dispersing the oil-wax mixture in any of a number of ways, it has been found desirable from the standpoint of ease of handling and efficiency of operation to use dispersions which are fairly fluid, and yet which are stable to moderate agitation, and which afford free surfaces of oily wax upon which the solvent may act. Obviously, particles of oily wax completely and firmly surrounded by a dispersive medium cannot be reached by the solvent and so leached of their oil. In other words, certain very stable finely divided emulsions of waxy oil or oily wax with caustic or other aqueous solutions have the emulsified particles so perfectly enclosed by a stable aqueous film that contact between them and the solvent cannot be established and therefore they cannot be extracted by the solvent. The type of emulsion desired is one which is stable enough to resist being broken by agitation with the solvent but in which the dispersed material is not so effectively protected by the aqueous film that contact with the solvent is prevented.

In preparing the dispersions of the above described types various mechanical means may of course be resorted to, such as high speed stirring, pumping through turbulent zones, or use of a colloid mill. Also, various aqueous and non-aqueous solvents including water alone, solutions of water-soluble acids, bases, or salts, glycols, glycerin, alcohol and the like, may be used as suspending or emulsifying mediums. Furthermore, various agents may be added as emulsifying agents or emulsion stabilizers. As such may be mentioned proteins such as gelatins, albumens, casein, etc.; pectins comprising the various gels; polysaccharides and hemicelluloses including starches; gums; tannins; clays; and soaps, such as soaps of rosin oil, oleic acid, Turkey red oil, etc. which soaps may be either preformed or formed in situ. Di- and tri-ethanolamine resinates have been found especially useful as addition agents to increase the fluidity or stability of the emulsion. The addition of such agents either to the mixture of oil and wax before it is emulsified or to the resulting emulsion have been found to have a beneficial effect especially in preventing the breaking of the emulsion during extraction with the solvent. Furthermore, it may be desirable to provide for inversion or other modification of the emulsion type. For this purpose various agents, such as acids, calcium and alkaline earth soaps, finely divided solids including asphalt, lamp black, etc. may be added.

The emulsification of the oily wax or waxy oil with the emulsifying agent preferably should take place at a temperature above the solidification of the oily wax or waxy oil.

If desired, in order to reduce the viscosity of the resulting emulsion, the mixture of oil and wax may be prediluted with a small amount of solvent prior to emulsification. For instance, a mixture of oil and wax is mixed with approximately an equal volume of solvent miscible with it at a temperature above the solidification point. An emulsion stabilizing agent, such as 1% triethanolamine resinate, may be added to the initial wax-oil mixture or to it after dilution with solvent. To this mixture is added an approximately equal volume of 1 to 3% caustic soda solution at a temperature above the solidification point of the solvent-wax-oil mixture, and the whole is agitated vigorously to produce emulsification. The resulting emulsion may then be cooled with or without further agitation to any desired temperature below the solidification point of the solvent-wax-oil mixture in the emulsion, before adding solvent for the washing step.

Another embodiment of the invention as it relates particularly to the preparation of the oily wax in a dispersed state prior to deoiling may be described as follows: The wax to be deoiled is heated to a temperature above its melting point, such as between 135° F. and 175° F. To the melted wax is added an appropriate volume of dilute caustic soda solution (1° to 5° Baumé), which according to the type of wax treated may vary from about 20 to 50% of the total solution. The temperature of the caustic solution is approximately that of the melted wax, i. e. 135° to 175° F. This mixture is agitated as by circulation through a gear pump until intimate commingling has taken place. The emulsion so formed is cooled, without further agitation, until a temperature is reached at which the viscosity of the mixture increases because of the solidification of the wax.

Emulsions prepared in either of these ways are sufficiently fluid to be readily handled in a continuous process. They are sufficiently stable to withstand pumping without breaking and are easily dispersed in solvent and readily extracted. Such emulsions settle rapidly and may be readily broken by agitation to recover the deoiled wax.

In some instances it may be desirable to incorporate benzene and/or acetone and their homologs in the emulsion of wax and water. For example it has been found that in many instances benzene greatly increases the fluidity of the wax or oil and also the emulsion which is formed when benzene is present. It is also highly desirable in many instances to incorporate some of the freezing point lowering agents, as for example acetone, in the emulsion in order that the emulsion may be chilled to as low a temperature as possible and still avoid freezing. The presence of the freezing point lowering agents results in better extraction, since apparently the wax particles are largely in the chilled emulsions containing these freezing point lowering agents.

The purpose of emulsifying the oil-wax mixture is, of course, to prepare it for deoiling or dewaxing, depending on whether the process is used for the removal of oil from oily wax, or of wax from waxy oil. This is accomplished by washing the dispersion with a solvent. The solvents which I employ are composed of a good oil solvent such as propane, butane, pentane, hexane, light hydrocarbon mixtures such as those found in casinghead gasoline, light naphtha, ethylene dichloride, carbon tetrachloride, benzene, toluene, and xylene, which are insoluble in water mixed with good wax anti-solvents such as acetone, methyl ethyl ketone, diethyl ketone, methyl propyl ketone, ethyl propyl ketone, dipropyl ketone, methyl butyl ketone, ethyl butyl ketone, propyl butyl ketone, methyl isobutyl ketone, an alcohol, particularly an alcohol such as isopropyl alcohol, butyl alcohol, isobutyl alcohol etc., which is a good oil solvent, an ester such as methyl acetate, ethyl acetate etc., an ether such as diethyl ether, ethyl propyl ether.

Briefly stated, the solvent employed to remove the oil from the emulsion or dispersion is one which contains a water insoluble oil solvent mixed with a water soluble wax anti-solvent, the mixture being such that when mixed with water or an aqueous solution such as used for emulsifying oily wax or waxy oil, the water insoluble oil solvent holds most of the water soluble wax anti-solvent in solution, allowing only a small percentage of the latter to become dissolved or extracted into the water or aqueous solution. This partition of water soluble wax anti-solvent allows the mixed solvent to retain its oil solvent wax anti-solvent properties and at the same time permits the water or aqueous phase to take up sufficient of the water soluble wax anti-solvent to lower the freezing point of the water or aqueous solution sufficiently to permit extraction of the wax-oil emulsions at temperatures low enough to result in efficient separation of oil from wax or wax from oil.

In washing the dispersed mixture of oil and wax, it has sometimes been found desirable to use a solvent, the temperature of which is lower than that of said dispersed oil-wax mixture.

The emulsion should be preferably cooled to a temperature just above the freezing point of the aqueous solution used as the dispersing agent or to as low a temperature as possible without the emulsion becoming so viscous it cannot be pumped.

The washing operation comprises mixing solvent with the suspension of oil and wax, agitating the mixture and allowing it to settle and separate into layers, and then removing the resulting solvent and extracted oil layer as by decantation. One or more washings of the emulsified mixture with solvent may be employed to remove the oil from the wax. If the oil-wax emulsion has been carefully prepared, it will be found sufficiently stable that it can be repeatedly re-extracted with solvent without de-emulsifying. In batch operations, four or five extractions are usually found sufficient to result in substantially complete separation of oil and wax. If the operation is carried out in a continuous manner, the number of stages will approximate that necessary in solvent refining of lubricating oil to remove sludge forming or low viscosity index constituents. However, this invention is not restricted to any fixed number of extractions, to any given solvent ratio, nor to any set temperatures of emulsification and extraction as these may vary widely according to the type of stock being treated, its oil and wax content, the results desired, the solvent used, etc. For instance, it may be desired to operate the process to effect a separation of deoiled wax into low and high melting wax fractions. This may be accomplished by operating at somewhat higher temperatures than would be used to remove oil from wax, or by a suitable choice of solvent.

For a better understanding of the operations of the present process reference is now made to the drawing, the single figure of which represents diagrammatically an assembly adapted to be used in connection with the dewaxing of wax-bearing oils according to the present process. As shown in the drawing, the waxy oil is withdrawn from storage tank 1 and is conveyed through line 2 into line 4 in which it may be commingled with a diluent, such as cleaner's naphtha introduced through line 3. The emulsifying agent, such as a sodium hydroxide solution, stored in tank 6, is conveyed into line 4 through line 5. The mixture then passes through line 7 into a mixer 8 which provides thorough commingling so as to produce an emulsion, which is then conveyed through line 9 into a cooler 10 in which the emulsion is cooled to the desired or optimum temperature which is below the solidification point of the wax. The leaching solvent, such as an acetone-benzol solution, is withdrawn from storage 12 and is conveyed through line 13 provided with a cooler 16 adapted to bring the temperature of the solvent substantially to that of the emulsion. After a thorough commingling of the emulsion and of the chilled solvent coming from line 13, the mixture is allowed to settle in separator 11. The supernatant solution of wax-free oil and solvent is then withdrawn through line 14, while the emulsified wax is removed from the bottom of separator 11 through line 15, this wax being substantially free from oil.

The following are two specific examples of separating oil and wax according to the process which I have invented.

*Example 1*

To 100 ml. of S. A. E. 50 waxy distillate (containing about 10–12% wax and having a pour point of 110° F.) 1% by weight of triethanolamine resinate was added. Then 100 ml. of cleaners' naphtha were added to the waxy oil containing the triethanolamine resinate. A 100 ml. portion of this solution was then emulsified by mechanical stirring with 100 ml. of 3° Baumé caustic soda solution. The emulsion components were mixed at 135° F. and stirring was continued until the temperature had dropped to 90° F. The emulsion was then cooled to 35° F. (stirring with a thermometer at intervals) in an ice bath and slowly poured into 800 ml. of a benzene-acetone mixture (containing 50% benzene and 50% acetone) previously cooled to +5° F. in an ice and salt bath. The mixture was stirred with a thermometer and then let settle for 30 minutes at 5° to 10° F. The clear settled solvent layer was decanted and the solvent evaporated. The oil remaining was cooled to 32° F. in an ice bath and showed no signs of solidification or of separation of wax crystals after standing at this temperature for 30 minutes. The pour point of the oil was estimated to be about 25° F. (this is the normal viscosity pour point of this dewaxed stock).

A portion of the settled emulsion was freed of water and solvent by evaporation. The wax remaining had a melting point of 135° F. (Galician method).

*Example 2*

An emulsion was prepared from S. A. E. 50 slack wax (having a melting point of 125° F.) as follows: To the slack wax there was added 1% of triethanolamine resinate and an equal value of cleaner's naphtha. To the naphtha diluted slack wax containing the triethanolamine resinate, 2 volumes of 3° Baumé caustic were added. This mixture was then thoroughly stirred until an emulsion was produced. A 20 ml. portion of the emulsion so produced was then mixed with 80 ml. of a benzene-acetone mixture (containing 50% benzene and 50% acetone) at 32° F. This mixture was then allowed to settle for 15 minutes and the clear solution of supernatant liquid consisting of the solvent and dissolved oil, was then separated from the emulsion. The remaining emulsion was then transferred to a hot plate and after removal of the water and solvent by evaporation, the wax remaining in the vessel was found to have a melting point of 150–153° F. Ubbelohde.

When I refer to the term "extractant" in the claims, I am referring to the liquid which is employed to remove or dissolve the oil from the emulsion. Thus, as has been previously explained, the extractant may be a low boiling petroleum hydrocarbon mixed with an ether, ketone or alcohol or it may be an aromatic hydrocarbon such as benzol mixed with a ketone such as acetone or it may be any one of the previously described solvent mixtures.

The foregoing is merely illustrative and is not to be construed as limiting the invention which I claim.

I claim:

1. A method for the separation of wax and oil from an oil-wax mixture which comprises mixing said wax-oil mixture with a soap and an aqueous solution of an alkali and thereby forming an emulsion, cooling the emulsion, commingling the emulsion with an extractant containing an oil solvent and a wax anti-solvent and separating the extractant and dissolved oil fractions from the emulsion containing the wax.

2. A method for the separation of wax and oil from an oil-wax mixture which comprises forming an emulsion of said wax-oil mixture, commingling said emulsion with a mixture of acetone and benzene and separating the acetone-benzene solution of dissolved oil fractions from the emulsion containing the wax.

3. A method for the separation of wax and oil from an oil-wax mixture which comprises mixing said wax-oil mixture with an aqueous solution of an alkali and thereby forming an emulsion, cooling the emulsion, commingling the cooled emulsion with an acetone-benzene mixture and separating the acetone-benzene solution of oil from the emulsion containing the wax.

4. A process according to claim 3 in which the acetone-benzol mixture is cooled prior to its addition to the emulsion.

5. A method for the separation of wax and oil from an oil-wax mixture which comprises mixing with the wax-oil mixture a small quantity of soap and an aqueous solution of alkali and thereby forming an emulsion, cooling said emulsion, extracting the cooled emulsion with a mixture of acetone and benzol and separating the benzol-acetone solution of oil fractions from the emulsion.

6. A method for the separation of wax and oil from an oil-wax mixture which comprises mixing said wax-oil mixture with an aqueous solution of alkali and thereby forming an emulsion, cooling the emulsion, separately cooling an extractant containing an oil solvent and a wax anti-solvent to a temperature lower than the temperature of the emulsion, commingling the cooled emulsion with the cooled extractant and separating the extractant and dissolved fraction from the emulsion containing the wax.

7. A method according to claim 6 in which the extractant comprises a mixture of acetone and benzol.

VANCE N. JENKINS.